R. M. LA SALLE.
STEERING DEVICE.
APPLICATION FILED MAY 11, 1916.
1,266,284.
Patented May 14, 1918.
3 SHEETS—SHEET 1.
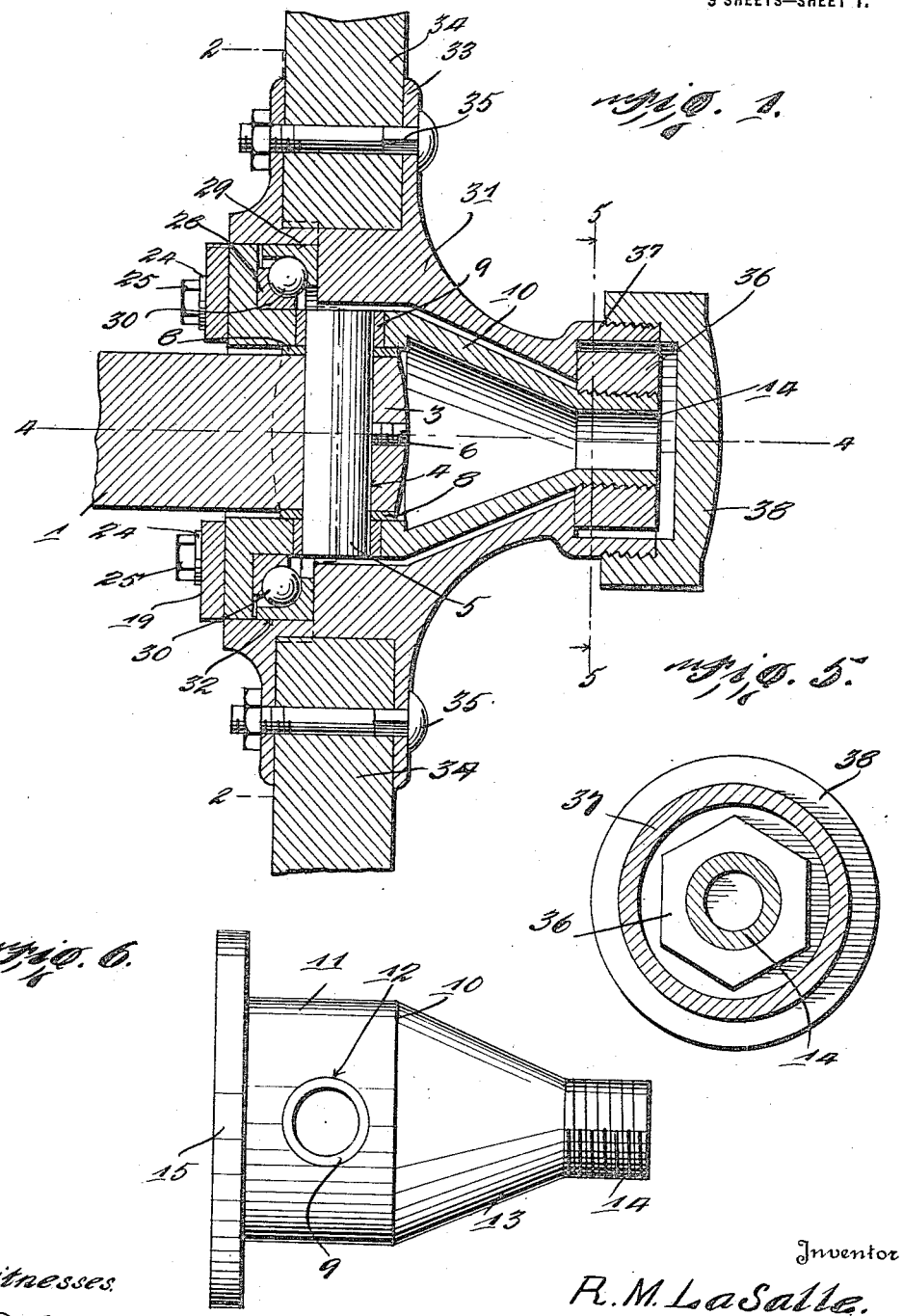
Witnesses:
Inventor
R. M. LaSalle.
By his Attorneys R. M. LA SALLE.
STEERING DEVICE.
APPLICATION FILED MAY 11, 1916.
1,266,284.
Patented May 14, 1918.
3 SHEETS—SHEET 2.
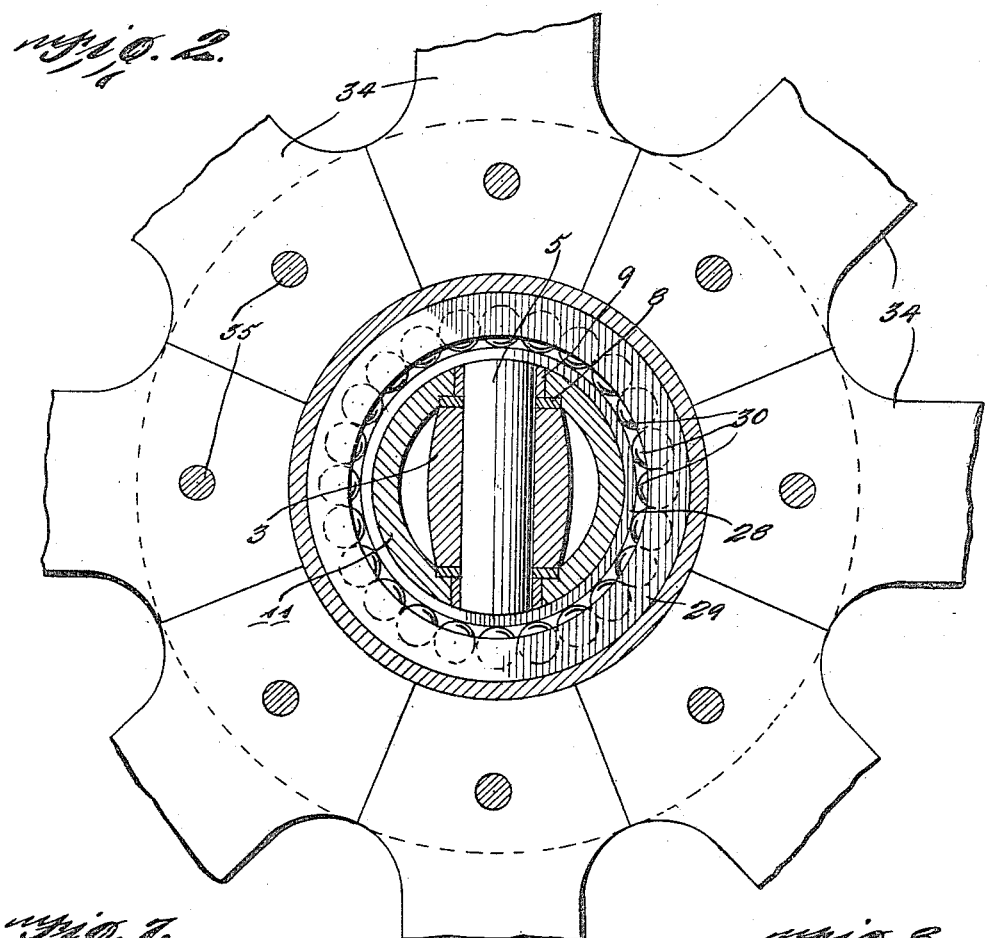
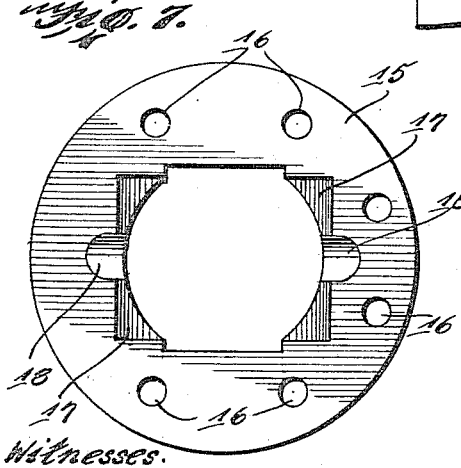
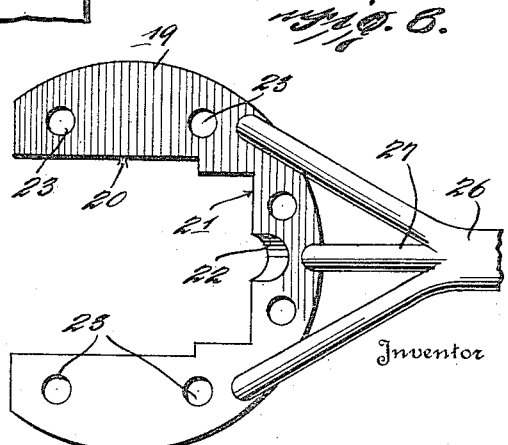

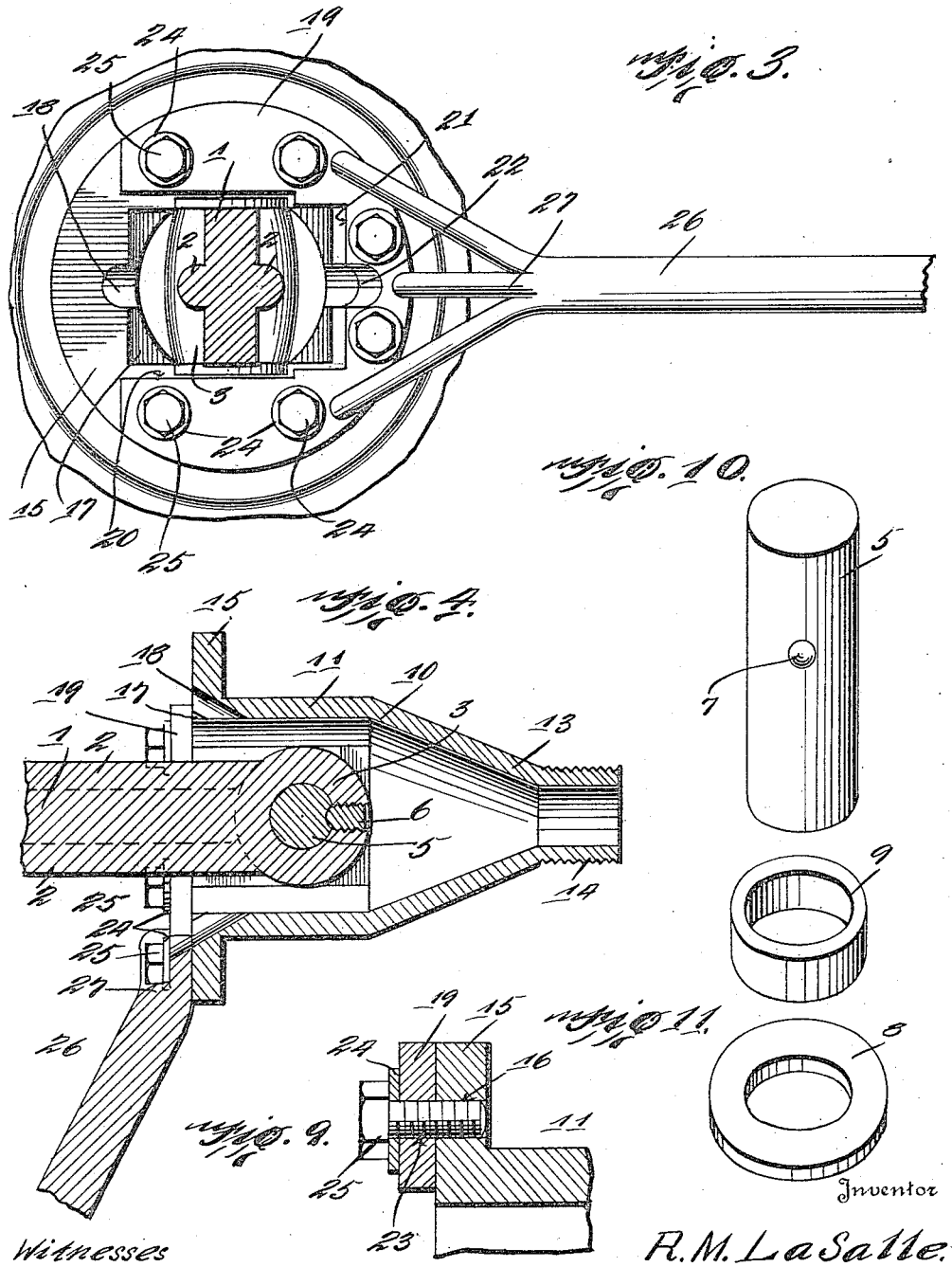

UNITED STATES PATENT OFFICE.

ROBERT M. LA SALLE, OF MIAMI, ARIZONA, ASSIGNOR TO WILLIAM I. TUPMAN, OF GLOBE, ARIZONA.

STEERING DEVICE.

1,266,284.  Specification of Letters Patent.  Patented May 14, 1918.

Application filed May 11, 1916. Serial No. 96,915.

*To all whom it may concern:*

Be it known that I, ROBERT M. LA SALLE, a citizen of the United States of America, residing at Miami, in the county of Gila and State of Arizona, have invented certain new and useful Improvements in Steering Devices, of which the following is a specification, reference being had therein to the accompanying drawing.

This invention relates to steering devices and has for its principal object the production of a structure which is so formed as to be easily applied to all self-propelled vehicles in such a manner as to permit the vehicles to be very easily steered in a desired direction with the least possible energy for accomplishing this purpose, while minimizing the number of parts becoming broken when in operation.

Another object of this invention is the production of a steering device which has a pin extending through the axle upon which the hub spindle is mounted so that this hub spindle may pivot upon this pin as the steering device is operated, thereby permitting the vehicle upon which the steering device is mounted to be easily directed as desired.

A still further object of this invention is the production of a steering device which is constructed of a minimum number of simple parts so assembled as to minimize the possibility of the device becoming out of order when in operation, whereby the device may be in condition to be easily operated at all times.

With these and other objects in view this invention consists of certain novel combinations, constructions, and arrangements of parts as will be hereinafter fully described and claimed.

In the accompanying drawing:—

Figure 1 is a vertical section through the steering device as constructed in accordance with this invention.

Fig. 2 is a vertical section taken at right angles to Fig. 1, along the line 2—2 of Fig. 1.

Fig. 3 is a rear elevation of the steering device, the axle being shown in section.

Fig. 4 is a horizontal sectional view of the device, taken on the line 4—4 of Fig. 1, the hub sleeve being removed.

Fig. 5 is a section taken on the line 5—5 of Fig. 1, looking in the direction of the arrows, the retaining nut being shown in elevation.

Fig. 6 is a top plan view of the hub spindle.

Fig. 7 is a rear elevation of the hub spindle.

Fig. 8 is an elevation of the plate adapted to be attached to the flange of the hub spindle showing the spindle rod attached thereto.

Fig. 9 is an enlarged fragmentary sectional view of a portion of the device, illustrating the manner in which the spindle plate is connected to the hub spindle.

Fig. 10 is a detail perspective view of the pivot pin.

Fig. 11 is a detail perspective view of a certain bushing used in connection with this invention.

Referring to the accompanying drawings by numerals it will be seen that 1 designates the axle having the side ribs 2 formed thereon, which extend substantially throughout the entire length of the axle although adjacent the ends thereof they terminate so as to permit the body 3 having the central bore 4 to be formed thereon. The pin 5 as shown in Fig. 1 is passed through the bore 4 of the body 3 so as to project for a distance above and below the axle 1, as shown in Figs. 1 and 2. The set screw 6 is carried by the body 3 and passes into the socket 7 formed in the pin 5 thereby fixedly holding the pin 5 in a set position with respect to the body 3. The washers 8 are positioned upon the projecting ends of the pin 5 as shown in Figs. 1 and 2 so as to bear upon the ends of the body 3. The bushings 9 are also positioned upon the projecting ends of the pin 5 and in turn bear upon the washers 8.

The hub spindle 10 is provided with a circular rear portion 11 which is adapted to encompass the body 3 of the axle 1. This circular rear portion 11 of the hub spindle 10 is provided with alined openings 12 in which the projecting ends of the pin 5 and bushings 9 fit, as shown in Fig. 1. It is, of course, obvious that in assembling the device it is necessary to position the circular rear portion 11 of the hub spindle over the body 3 of the axle 1, after which the washers may be interposed between the body and the hub spindle, and then in turn the pin may be passed through the openings 12 of the bore 4, after which the bushings may be placed in position so as to pivotally mount the hub spindle 10 upon the axle 1. This hub spindle 10 tapers toward its outer end so as to comprise a cone-like structure, as shown at 13, from which extends the externally threaded neck 14. The circular rear portion of the hub spindle 10 is provided with an integral annular flange 15 formed thereon in which there are formed a number of openings 16. The inner portions of this rear circular portion 11 are beveled outwardly as indicated at 17, these outwardly beveled portions 17 being in alinement with each other and through the center of these beveled portions there are formed deepened channels 18. Thus, it will be seen that as the spindle 10 is turned in either direction by pivoting upon the pin 5 the beveled portions 17 will accommodate the axle 1, while the channels 18 will accommodate the ribs 2, thus permitting the spindle to move to a greater degree than would be the case if these beveled portions and channels were not provided. The spindle plate 19 is provided with an enlarged integral pocket 20 so that this spindle plate 19 may be positioned upon the flange 15 of the hub spindle as shown clearly in Fig. 3. This pocket 20 has a notch 21 at its inner portion communicating with a second notch 22, which notch 21 corresponds in shape to one of the beveled portions 17 of the rear circular portion 11 of the hub spindle 10, while the notch 22 will conform in shape to one of the channels 18.

The spindle plate 19 is provided with a plurality of openings 23 which openings 23 are formed so as to register with the openings 16 formed in the flange 15 when the spindle plate is positioned thereon. The bearing washers 24 are then positioned upon the spindle plate 19 after which the machine screws 25 are passed through the openings 23 and into the openings 16 which are internally threaded for fixedly holding the spindle plate 19 in a set position upon the rear portions of the hub spindle 10. The steering rod 26 has a fork 27 extending therefrom, which fork 27 is secured in any suitable manner upon the spindle plate 19. As a consequence, when the rod 26 is swung in a desired direction the spindle plate 19 will in turn swing the hub spindle 10 in a desired direction inasmuch as the hub spindle as above set forth is pivotally mounted upon the pin 5. A bearing ball ring 28 is positioned upon the rear circular portion 11 of the hub spindle 10 so as to bear against the forward sides of the annular flange 15 of the hub spindle 10. A ring 29 is positioned over the rear circular portion 11 of the hub spindle 10 although in spaced relation with reference to the ring 28, whereby sufficient space is provided between these two rings, since they are internally beveled as shown in Fig. 1, thereby constituting a bearing ball race in which the bearing balls 30 are positioned. The hub sleeve 31 is positioned upon the hub spindle 10 since the interior of the hub sleeve 31 is formed so as to conform somewhat in shape to the outer periphery of the hub spindle 10. It should be noted that the sleeve 31 is provided with an annular groove 32 for the reception of the rings 28 and 29, thereby causing the hub sleeve to be rotatably mounted upon the spindle. This hub sleeve 29 is, of course, provided with parallel flanges 33 between which the inner ends of the spokes 34 are positioned, these spokes being retained in their correct engagement with the flanges 33 by means of the bolts 35 passing through the flanges and also through the inner ends of the spokes 34. The nut 36 may be positioned upon the externally threaded neck 14 so as to fit within the flared outer end 37 of the hub sleeve 31, thereby retaining the hub sleeve upon the hub spindle 10. It is, of course, obvious that the flared outer end 37 of the hub sleeve 31 may be externally threaded so as to carry the dust cap 38, as shown in Fig. 1.

What is claimed is:—

1. In a device of the class described, the combination of a hub-spindle, said hub-spindle provided with an annular flange, said flange provided with opposite beveled portions, and with a channel in the center of each of said beveled portions, a plate provided with a steering-rod connection, said plate provided with a notch registering with one of the beveled portions of the flange, said plate also provided with a channel in the center of the notch registering with the channel on said flange, means fastening said plate and flange together, a hub-sleeve mounted upon said hub-spindle, and an axle with side ribs movably mounted in said hub-spindle.

2. In a device of the class described, the combination of a hub-spindle, said hub-spindle provided with an annular flange at one end, said flange provided with a rectangular opening, and at opposite sides of said opening are beveled portions, each beveled portion being provided with a central channel, a bifurcated plate provided with steering-rod connection engaging said annular flange of said hub-spindle, said plate provided at its inner end with a socket-portion and a channel, each registering with similar portions on said flange, means securing the plate and flange together, a hub-sleeve mounted upon said hub-spindle, and an axle with side ribs movably mounted in the hub-spindle, substantially as shown and described.

In testimony whereof I hereunto affix my signature.

ROBERT M. LA SALLE.